(12) United States Patent
Morse et al.

(10) Patent No.: US 12,108,751 B1
(45) Date of Patent: Oct. 8, 2024

(54) FISHING EVENT MONITORING SYSTEMS AND METHODS

(71) Applicant: Donn R. Morse, Moscow, ID (US)

(72) Inventors: Donn R. Morse, Moscow, ID (US); Trevor A. Morse, Monroe, WA (US)

(73) Assignee: Donn Morse, Moscow, ID (US)

( * ) Notice: Subject to any disclaimer, the term of this patent is extended or adjusted under 35 U.S.C. 154(b) by 0 days.

(21) Appl. No.: 18/620,613

(22) Filed: Mar. 28, 2024

(51) Int. Cl.
| | | |
|---|---|---|
| *A01K 97/12* | (2006.01) | |
| *G01G 17/00* | (2006.01) | |
| *G01H 1/00* | (2006.01) | |
| *G01P 3/50* | (2006.01) | |

(52) U.S. Cl.
CPC ........ *A01K 97/125* (2013.01); *G01G 17/00* (2013.01); *G01H 1/00* (2013.01); *G01P 3/50* (2013.01)

(58) Field of Classification Search
CPC ...... G01H 1/00; A01M 31/002; A01K 97/125
See application file for complete search history.

(56) References Cited

U.S. PATENT DOCUMENTS

| | | | | |
|---|---|---|---|---|
| 4,854,072 A | * | 8/1989 | Pecor | A01K 91/08 43/43.15 |
| 4,930,243 A | * | 6/1990 | Lowe | A01K 97/125 43/17 |
| 5,088,223 A | * | 2/1992 | Chu | A01K 97/125 43/25 |
| 5,115,598 A | * | 5/1992 | Shaw | A01K 97/10 248/538 |
| 5,581,930 A | * | 12/1996 | Langer | A01K 97/00 43/17 |
| 7,934,338 B2 | * | 5/2011 | Hope | A01K 97/125 43/17 |
| 11,651,666 B2 | * | 5/2023 | Dougan | G08B 29/188 340/545.1 |
| 2005/0218256 A1 | * | 10/2005 | Ikuta | A01K 89/015 242/288 |
| 2005/0259515 A1 | * | 11/2005 | Maesawa | A01K 91/06 367/111 |
| 2006/0016117 A1 | * | 1/2006 | Aanenson | A01K 91/08 43/42.31 |
| 2006/0075675 A1 | * | 4/2006 | Goretti | A01K 97/125 43/17 |
| 2006/0265931 A1 | * | 11/2006 | Mcfadden | A01K 97/125 43/17 |
| 2008/0016749 A1 | * | 1/2008 | Priednieks | A01K 89/0108 340/573.2 |
| 2008/0066367 A1 | * | 3/2008 | Meeks | A01K 97/125 43/17 |
| 2009/0158635 A1 | * | 6/2009 | Hope | A01K 97/125 43/4.5 |

(Continued)

FOREIGN PATENT DOCUMENTS

| | | | | | |
|---|---|---|---|---|---|
| CN | 103947623 A | * | 7/2014 | | |
| GB | 2394635 A | * | 5/2004 | .......... | A01K 97/125 |
| KR | 20240000216 A | * | 1/2024 | | |

*Primary Examiner* — Hoi C Lau
(74) *Attorney, Agent, or Firm* — Kolitch Romano Dascenzo Gates LLC

(57) ABSTRACT

Systems and methods of monitoring fishing events use one or more inertial measurement units disposed on fishing tackle to measure vibrations transmitted along the fishing tackle, analyze the vibrations to determine a fishing event, and present the fishing event to a user.

30 Claims, 8 Drawing Sheets

(56) References Cited

U.S. PATENT DOCUMENTS

| | | | |
|---|---|---|---|
| 2011/0067290 A1* | 3/2011 | Miskatovic | A01K 97/125 43/17 |
| 2014/0358483 A1* | 12/2014 | da Rosa | A01K 97/00 702/188 |
| 2018/0213761 A1* | 8/2018 | Carkner | G08B 5/22 |
| 2018/0295829 A1* | 10/2018 | Blackadar | G06N 5/04 |
| 2020/0107529 A1* | 4/2020 | Ikebukuro | A01K 97/125 |
| 2020/0107530 A1* | 4/2020 | Ikebukuro | A01K 97/125 |
| 2020/0260710 A1* | 8/2020 | Ferger | A01K 97/125 |
| 2022/0061289 A1* | 3/2022 | Yasuda | A01K 97/125 |
| 2022/0061291 A1* | 3/2022 | Yasuda | A01K 97/125 |
| 2022/0061294 A1* | 3/2022 | Yasuda | A01K 89/01931 |
| 2022/0061297 A1* | 3/2022 | Yasuda | A01K 87/007 |
| 2023/0404051 A1* | 12/2023 | Oda | A01K 97/125 |
| 2024/0041015 A1* | 2/2024 | Oda | A01K 97/125 |

* cited by examiner

FISHING EVENT MONITORING SYSTEMS AND METHODS

FIELD

This disclosure relates to systems and methods for monitoring and identifying fishing events.

INTRODUCTION

While fishing, it is important to carefully monitor the motion and response of the fishing rod for a sports fisherman, or the downrigger cable for a commercial troller, especially during critical events such as fish strikes, in order to successfully land a catch.

For fishing methods such as trolling by sports fishermen, where a fishing line attached to the fishing rod is drawn through the water at a consistent speed, it may be more difficult to accurately monitor and understand the motion and response of the fishing rod when compared to stationary fishing methods such as shoreline fishing. For example, while trolling, the fishing rod may be affected by tide conditions, trolling speed, line tension, debris, etc. Furthermore, anglers are often piloting the boat and monitoring multiple trolling assemblies during critical events, which may result in a missed catch.

For fishing methods such as trolling by commercial fishermen, where the fishing line is attached to a downrigger cable and drawn through the water at a consistent speed, it can be difficult to monitor multiple downrigger cables while simultaneously navigating the boat.

SUMMARY

The present disclosure provides systems, apparatuses, and methods relating to monitoring and identifying fishing events.

Methods of monitoring fishing events may include measuring, via an inertial measurement unit disposed on fishing tackle, vibrations transmitted along the fishing tackle; analyzing the vibrations to determine a fishing event; and transmitting a signal indicative of the fishing event to an output device.

Fishing event monitoring systems for use while trolling may include a housing configured to be operatively coupled to fishing tackle, an inertial measurement unit supported by the housing and configured to measure vibrations transmitted along the fishing tackle, a memory, and a plurality of instructions stored in the memory and executable to analyze the vibrations to determine a fishing event.

Features, functions, and advantages may be achieved independently in various embodiments of the present disclosure, or may be combined in yet other embodiments, further details of which can be seen with reference to the following description and drawings.

DETAILED DESCRIPTION

Figure 1:
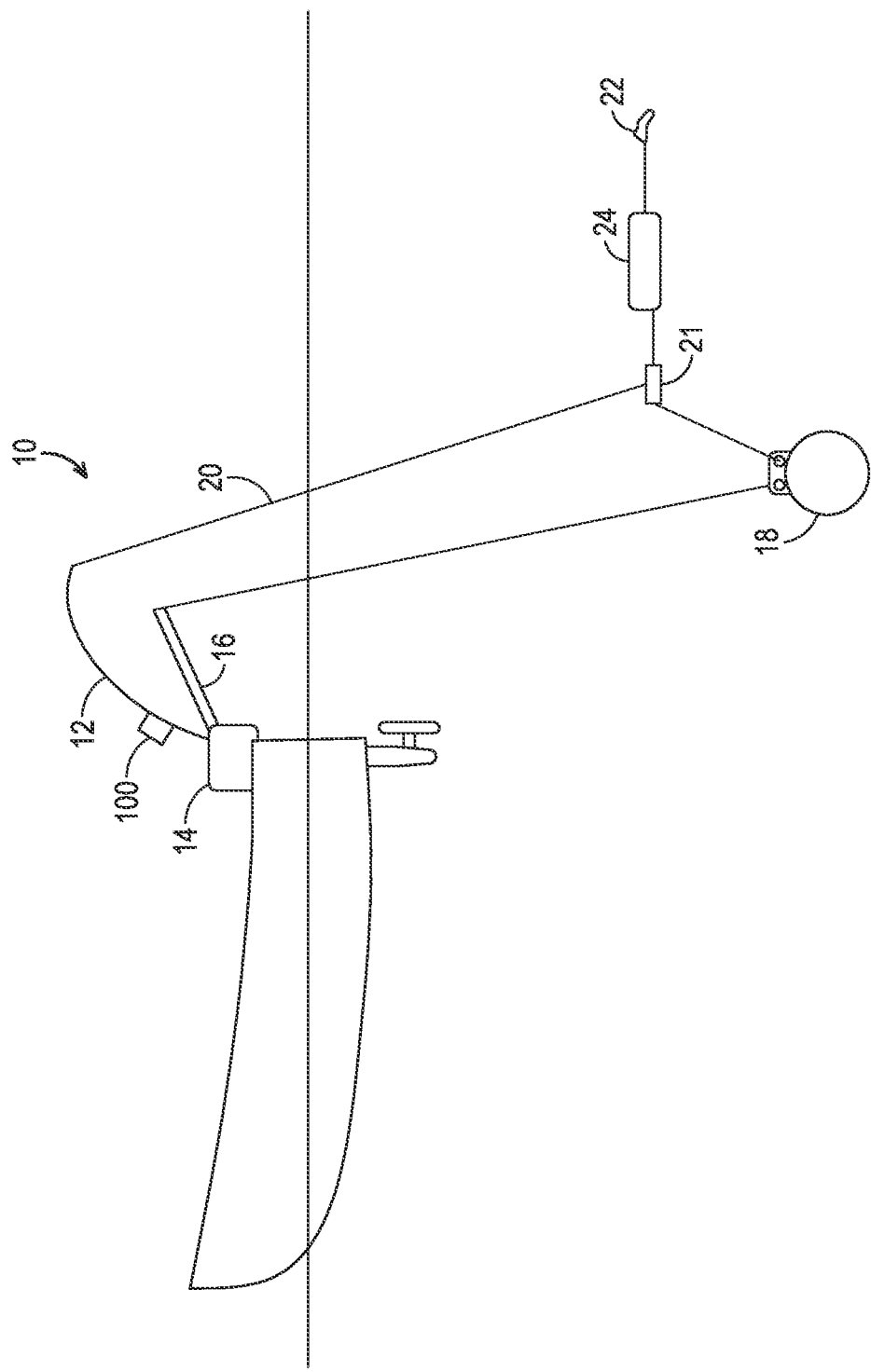
FIG. 1 is a schematic diagram of a trolling assembly in accordance with aspects of the present disclosure.

Various aspects and examples of fishing event monitoring systems for use with trolling assemblies, as well as related methods, are described below and illustrated in the associated drawings. Unless otherwise specified, a fishing event monitoring system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Data processing system" describes any suitable device(s) or hardware configured to process data by performing one or more logical and/or arithmetic operations (e.g., executing coded instructions). For example, a data processing system may include one or more processors (e.g., central processing units (CPUs) and/or graphics processing units (GPUs)), microprocessors, clusters of processing cores, FPGAS (field-programmable gate arrays), artificial intelligence (AI) accelerators, digital signal processors (DSPs), and/or any other suitable combination of logic hardware.

Overview

In general, fishing event monitoring systems of the present disclosure are configured to be coupled to fishing tackle. In some examples, the fishing tackle is a fishing rod. The fishing rod may be a part of a trolling assembly, e.g., the fishing rod may be coupled to a downrigger assembly. In some examples, the fishing tackle component is a portion of a downrigger assembly, such as a downrigger line, etc.

The fishing event monitoring systems include one or more inertial measurement units (IMUs) configured to measure vibrations transmitted along the fishing tackle, such as vibrations imparted by tide conditions, vibrations imparted by fishing events (e.g., fish strikes, etc.), and other events and/or conditions which may affect a portion of the fishing tackle and/or trolling assembly.

In some examples, the one or more IMUs are disposed within a waterproof housing having one or more coupling structures configured to couple the housing to the fishing tackle. For example, the housing may include one or more clips, brackets, clamps, and/or fasteners configured to couple the housing to the fishing tackle, such that vibrations transmitted along the fishing tackle are adequately measurable by the one or more IMUs. Additionally or alternatively, and as more specific examples, the housing may include one or more coupling structures configured to couple the housing to a portion of the fishing rod, a fishing reel, and/or a portion of the trolling assembly.

In some examples, the one or more IMUs are configured to measure the vibrations at a predetermined sample rate which may be set by a user of the system. For example, the one or more IMUs may be configured to measure the vibrations at a sample rate of 10 Hz, 100 Hz, etc.

In some examples, each of the one or more IMUs include one or more accelerometers configured to measure translational (e.g., linear) vibrations along one or more axes, such as vibrations along an X-axis, vibrations along a Y-axis, and/or vibrations along a Z-axis. Additionally, or alternatively, each of the one or more IMUs may include one or more gyroscopes configured to measure rotational vibrations about one or more axes, such as vibrations about an X-axis, vibrations about a Y-axis, and/or vibrations about a Z-axis.

In some examples, the one or more IMUs may be configured to measure vibrations only along and/or only about a single axis. For example, the one or more IMUs may be configured to measure vibrations along an axis perpendicular to the length of the fishing rod (e.g., side-to-side vibrations).

The fishing event monitoring systems may include data processing systems configured to execute instructions stored on computer-readable storage medium to analyze vibration data relating to the vibrations detected by the one or more IMUs and determine the occurrence of fishing events from the vibration data, thereby producing fishing event data. In general, fishing events refer to an event such as a fish striking the lure, a fish being caught on the line, debris being caught on the line, changes in tide conditions, and other events which may occur during fishing/trolling. The fishing event data may then be presented to a user as described below.

In general, analyzing the vibration data to determine fishing events may include analyzing the vibration data to identify changes (e.g., spikes, oscillations, etc.) in an amplitude of the vibrations, changes in a frequency of the vibrations, changes in the phase/orientation of the vibrations, and/or other changes in the vibrations indicative of a fishing event.

In some examples, analyzing the vibration data may include comparing an amplitude (e.g., an instantaneous amplitude, an amplitude envelope, etc.) of the vibrations to an amplitude threshold value to determine the fishing event. The amplitude threshold value may be manually assigned, e.g., by a user, during manufacturing, etc., and/or automatically assigned, e.g., based on historical fishing events, based on a selection of a species of fish, etc. In some examples, the amplitude threshold value may be a learned value. For example, the amplitude threshold value may be automatically assigned by a machine learning algorithm based on historical fishing event data. In some examples, there may be multiple amplitude threshold values, each amplitude threshold value indicating a different fishing event.

In some examples, analyzing the vibration data may include identifying pulses and/or duty cycles in the amplitude of the vibrations. For example, different species of fish may have different response behaviors when hooked on a fishing line, resulting in species-specific pulses or duty cycles in the vibrations. As an illustrative example, one species of fish may produce a series of short pulses in the amplitude of the vibrations, while another species of fish may produce longer pulses in the amplitude. In some examples, a species-specific amplitude pulse length may be a learned value, e.g., learned by a machine learning model trained on historical vibration data.

In some examples, analyzing the vibration data may include identifying changes in the frequency and/or component frequencies of the vibrations. For example, changes to the frequency and/or component frequencies of the vibration may be identified and categorized as one or more fishing events. Analyzing the vibration data to identify changes in the frequency and/or component frequencies of the vibrations may include utilizing a Fourier transform (FT) to separate component frequencies of the vibrations and identifying changes in the component frequencies.

The Fourier transform may be implemented as a discrete Fourier transform (DFT) algorithm for analyzing the frequency domain of the vibration data at a discrete sample rate, e.g., at the sample rate of the IMUs. In some examples, the Fourier transform may be implemented as a fast Fourier transform (FFT) algorithm. In some examples, the Fourier transform may be implemented as a short-term Fourier transform (STFT) algorithm, such as a sliding DFT algorithm, or other suitable frequency analysis algorithm.

In some examples, analyzing the vibration data may include identifying a background noise frequency of the vibrations (e.g., via an FT algorithm), and filtering the vibration data to remove the background noise frequency. For example, a background noise frequency may correspond to motion of a lure and/or a flasher within the water. Accordingly, the system may be configured to filter the vibration data to remove (and/or dampen) the background noise frequency corresponding to the motion of the lure and/or the flasher. In some examples, the background noise frequency is automatically determined, e.g., based on a known frequency associated with a known lure and/or flasher. For example, a user may provide the system with information related to the lure and/or flasher, such as type, make, model, size, etc., and the background noise frequency may be determined accordingly. In some examples, the background noise frequency is a learned value, e.g., learned by a machine learning model trained on historical vibration data.

In some examples, analyzing the vibration data may include identifying changes to the phase and/or orientation of the vibrations. Changes to the phase and/or the orientation of the vibrations may be identified by comparing the relative amplitudes along/about respective axes of a multi-axis IMU and identifying changes in the relative amplitudes that correspond to known fishing events. For example, certain debris types being caught on a lure and/or flasher, changes in tide conditions, and/or other events may correspond to changes in the phase and/or the orientation of the vibrations.

In general, disclosed systems are configured to analyze the vibration data to determine the fishing event such that information relating to the fishing event may be presented to a user of the system such as an angler and/or spectator (e.g., a user of the system who may not be the angler).

In some examples, the fishing event is a fish striking a lure and/or being hooked on a line of the fishing rod. For example, an instantaneous amplitude of the vibrations surpassing an amplitude threshold value may be indicative of a fish striking a lure and/or being hooked on the line. In some examples, such as when there are multiple amplitude threshold values, the fishing event may include a determination of whether or not the fish is below a threshold weight value. For example, based on characteristics of the vibrations, analyzed as described above, a determination of the relative age and/or size of the fish may be accomplished.

In some examples, the fishing event includes debris being hooked on a line of the fishing rod. In some examples, the type of debris may be automatically determined by measured characteristics of the vibrations. For example, based on characteristics of the vibrations, analyzed as described above, a determination of the type of debris (e.g., kelp, seaweed, jellyfish, artificial debris, etc.) may be accomplished.

In some examples, the fishing event includes a change in tide conditions, such as tide speed, tide direction, etc. For example, a change in tide speed and/or tide direction may correspond to changes in background noise frequency, changes in other component frequencies, changes in amplitude, and/or other measurable changes in the vibrations. In some examples, the disclosed systems are configured to analyze the vibration data to determine a target trolling speed of the boat. For example, by comparing one or more component frequencies and/or amplitude of the vibrations to known values corresponding to known trolling speeds, a target trolling speed may be determined. In some examples, determining the target trolling speed may be dependent on the lure and/or flasher type being used.

In general, disclosed systems may include a data transmission system configured to transmit a signal indicative of the vibrations and/or the fishing event to an output device. In some examples, the data transmission system is a wireless communication system. For example, the data transmission system may comprise a wireless radio transmission system. The signal transmitted by the data transmission system may comprise the sampled vibration data from the IMUs and/or fishing event data.

In examples in which the data processing system is an onboard data processing system (i.e., supported by the housing), the data transmission system may be configured to transmit data relating to the fishing event (e.g., the type of fishing event) to the output device. In examples, in which the data processing system is an offboard data processing system (i.e., located remotely from the housing), the data transmission system may be configured to transmit vibration data to the output device, which may then be sent to the data processing system for analysis.

In general, the system is configured to notify the user of a fishing event via one or more output devices. In some examples, the one or more output devices include visible indicators, such as light emitting diodes (LEDs) or other suitable visible indicator(s). For example, the one or more output devices may comprise an array of LEDs, each LED of the array corresponding to a different fishing event. In some examples, the one or more output devices include audible indicators (e.g., speakers), haptic indicators (e.g., vibration motors), and/or other devices suitable for notifying the user of a fishing event.

In some examples, the one or more output devices include a user interface, e.g., a mobile application, configured to be executed on a mobile device. For example, the user may receive a notification on their mobile device indicating the occurrence of a fishing event. In some examples, the notification includes a display of the fishing event on the user interface, an audible notification, and/or a haptic notification (e.g., vibration of the mobile device).

Technical solutions are disclosed herein for monitoring and detecting fishing events and notifying a user thereof. Specifically, the disclosed systems and methods address a technical problem tied to fishing technology and arising in the realm of fishing monitoring systems, namely the technical problem of identifying fishing events from vibrations detected on/along a fishing rod. The disclosed systems and methods provide an integrated practical application of the principles discussed herein by providing improvements to fishing monitoring devices and implementing the solution with devices that are integral to the functioning of the systems and methods, such as IMUs.

Aspects of the fishing event monitoring systems may be embodied as a computer method, computer system, or computer program product. Accordingly, aspects of the fishing event monitoring systems may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the fishing event monitoring systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the fishing event monitoring systems may be written in one or any combination of programming languages, including an object-oriented programming language (such as Java or C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer or server, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the fishing event monitoring systems may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally, or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the fishing event monitoring systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative fishing event monitoring systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Fishing Event Monitoring System

As shown in FIGS. 1-6, this section describes an illustrative fishing event monitoring system 100. System 100 is an example of the fishing event monitoring systems described above.

With respect to FIG. 1, system 100 is configured to be used with a trolling assembly 10 to monitor vibrations detected on a fishing rod 12. Fishing rod 12 may be attached to a downrigger assembly 14 having a boom 16 with a weight 18 lowered therefrom. A user may adjust a trolling depth by selectively lowering weight 18 to a desired depth. A fishing line 20 of fishing rod 12 is at least partially wound around a reel spool of a fishing reel and is configured to run along the length of the fishing rod. Fishing line 20 is coupled to weight 18, e.g., via a clip 21, such that fishing line 20 extends into the water to the depth of weight 18. Attached to the end of fishing line 20 is one or more items of terminal tackle, for example, a fishing lure 22 and a flasher 24. By utilizing weight 18 to keep the end of fishing line 20 submerged at the trolling depth, fishing rod 12 is held under tension (see FIG. 4), thereby facilitating the transfer of vibrations from the fishing line to the fishing rod.

Figure 2:
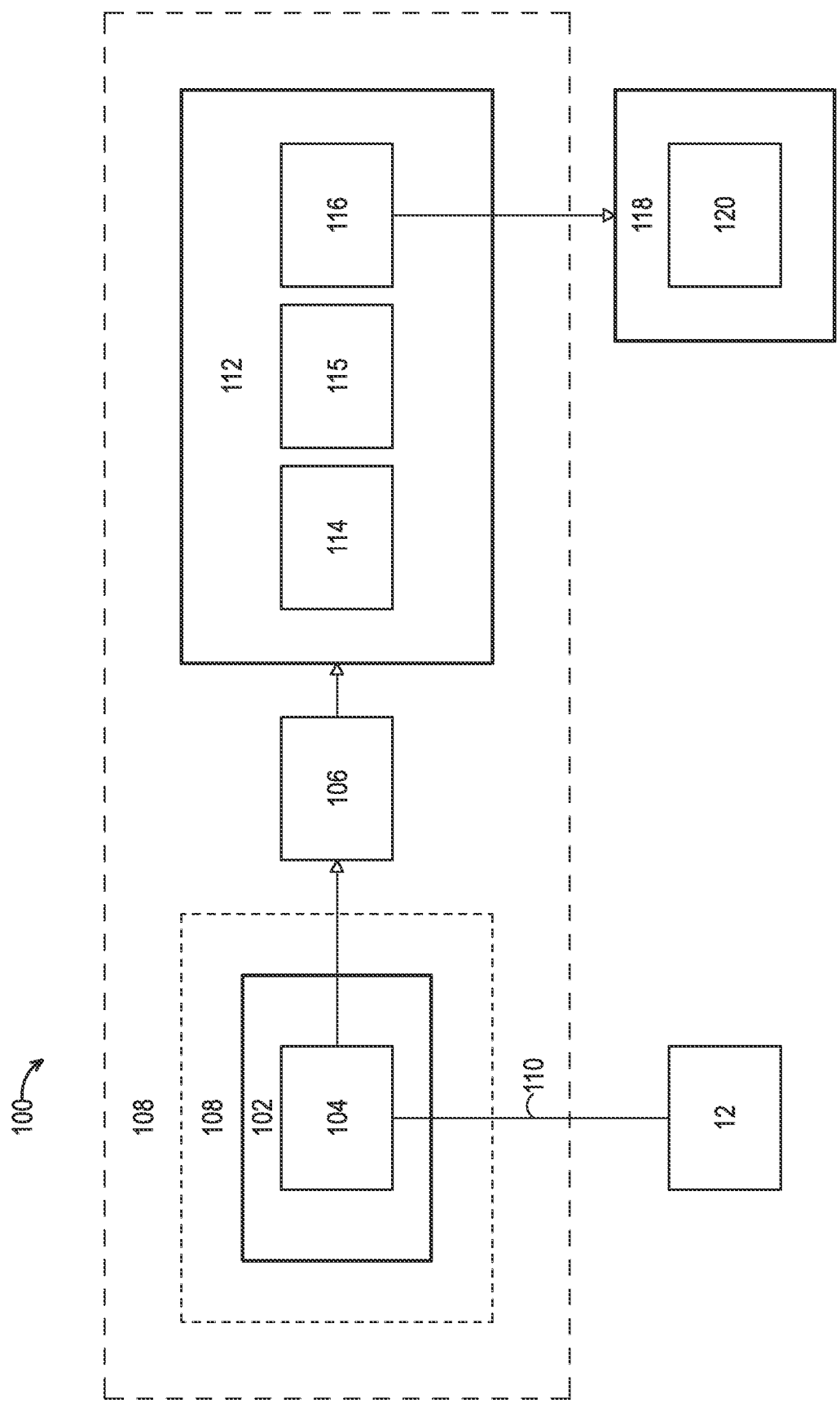
FIG. 2 is a schematic diagram of fishing event monitoring systems in accordance with aspects of the present disclosure.

Turning to FIG. 2, a schematic diagram of system 100 is depicted. System 100 includes a measurement device 102 having at least one inertial measurement unit (IMU) 104 configured to measure vibrations transmitted along fishing rod 12 to create vibration data 106. Vibrations may be imparted by tide conditions, changes to tide conditions, fish strikes, and other events and/or conditions which cause vibrations along fishing rod 12. In some examples, measurement device 102 may additionally include other devices/sensors such as a timer, a satellite tracking device (e.g., a global positioning system (GPS) device), a barometer, a thermometer, a speedometer, and/or other sensor.

IMU 104 may include one or more accelerometers configured to measure translational (e.g., linear) vibrations along one or more axes, such as vibrations along an X-axis, vibrations along a Y-axis, and/or vibrations along a Z-axis. Additionally, or alternatively, IMU 104 may include one or more gyroscopes configured to measure rotational vibrations about one or more axes, such as vibrations about an X-axis, vibrations about a Y-axis, and/or vibrations about a Z-axis.

In some examples, IMU 104 is configured to measure vibrations only along and/or only about a single axis. For example, IMU 104 may be configured to measure vibrations along an axis perpendicular to the length of the fishing rod (e.g., side-to-side vibrations). The axis may be selectable by a user, e.g., at the time of measurement and/or while fishing. In some examples, IMU 104 is configured to measure the vibrations at a known/predetermined sample rate. For example, IMU 104 may be configured to measure the vibrations at a sample rate of 10 Hz, 100 Hz, etc.

Figure 3:
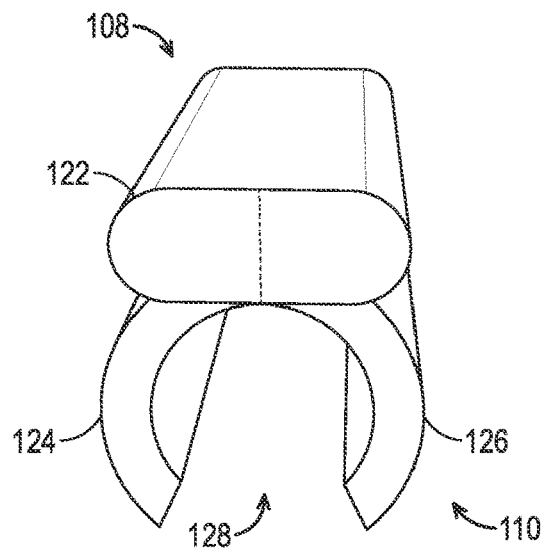
FIG. 3 is a perspective view of a housing for use with the fishing event monitoring system of FIG. 2.
Figure 4:
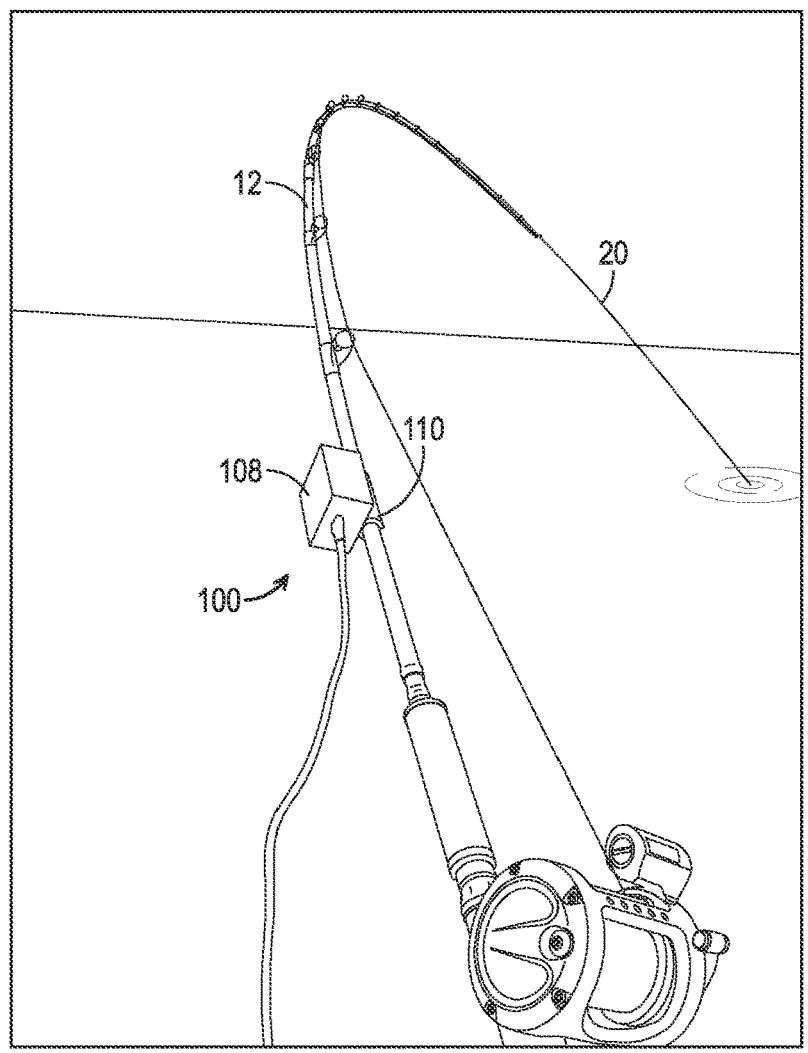
FIG. 4 is a perspective view of portions of the fishing event monitoring system of FIG. 2 coupled to a fishing rod.

Measurement device 102 and IMU 104 are disposed within a waterproof housing 108 having a coupling structure 110 configured to couple housing 108 to fishing rod 12 (see FIGS. 3 and 4). Coupling structure 110 may comprise one or more clips, brackets, clamps, and/or other fasteners suitable for coupling housing 108 to fishing rod 12. In some examples, coupling structure 110 may be configured to couple housing 108 to a portion of a fishing reel of fishing rod 12 or other portion of trolling assembly 10.

With continued reference to FIG. 2, vibration data 106 is provided to a data processing system 112 having a computer-readable storage medium 114 with instructions stored thereon and one or more processors 115 configured to execute the instructions on storage medium 114 to analyze vibration data 106. In some examples, data processing system 112 is disposed within housing 108, such that vibration data 106 may be provided directly to data processing system 112. Alternatively, data processing system 112 may be located remotely from housing 108, such that vibration data 106 is transmitted between IMU 104 and data processing system 112, e.g., via an electrically conductive wire and/or a wireless transmission system, e.g., a radio transmission system.

Data processing system 112 is configured to analyze vibration data 106 to determine the occurrence of a fishing event and produce fishing event data 116. The fishing event may be a fish striking the lure, a fish being caught on the line, debris being caught on the line, a change in tide conditions, and/or other event which may occur during fishing or trolling. Fishing event data 116 may be presented to a user via an output device 118. In some examples, fishing event data 116 is sent to output device 118 via a data transmission system, e.g., a wireless transmission system such as a wireless radio transmission system. Alternatively, in some examples, data processing system 112 is integrated with output device 118. For example, data processing system 112 and output device 118 may both be a respective portion of a single mobile device or other standalone hardware device.

Output device 118 includes one or more indicators 120 configured to alert the user of the fishing event. In some examples, indicators 120 include one or more visible indicators, such as light emitting diodes (LEDs) or other suitable visible indicator. For example, output device 118 may comprise an array of LEDs, with one or more LEDs of the array corresponding to a different fishing event. In some examples, indicators 120 include audible indicators (e.g., speakers), haptic indicators (e.g., vibration motors), and/or other devices suitable for notifying the user of the fishing event.

In some examples, output device 118 is a mobile device (e.g., a smartphone) and indicators 120 include a user interface and/or notification system of the mobile device. As an illustrative example, the user may receive a notification on their mobile device indicating the occurrence of the fishing event. The notification may include a display of the fishing event on the user interface, an audible notification, and/or a haptic notification (e.g., vibration of the mobile device).

Turning to FIGS. 3 and 4, an example of housing 108 and coupling structure 110 is shown. Housing 108 includes a body portion 122 configured to house and support measurement device 102 and optionally house and support data processing system 112. In the example depicted in FIG. 3, coupling structure 110 is a snap-fit structure comprising two hooked arms 124, 126, each arm having a semicircular contour. Arms 124, 126 form an opening 128 configured to receive a portion of fishing rod 12 and retain housing 108 thereon. Coupling structure 110 is configured to provide a friction fit, such that housing 108 does not slide along or rotate about fishing rod 12 during use. In some examples, coupling structure 110 may include a set screw or other suitable fastener.

Figure 5:
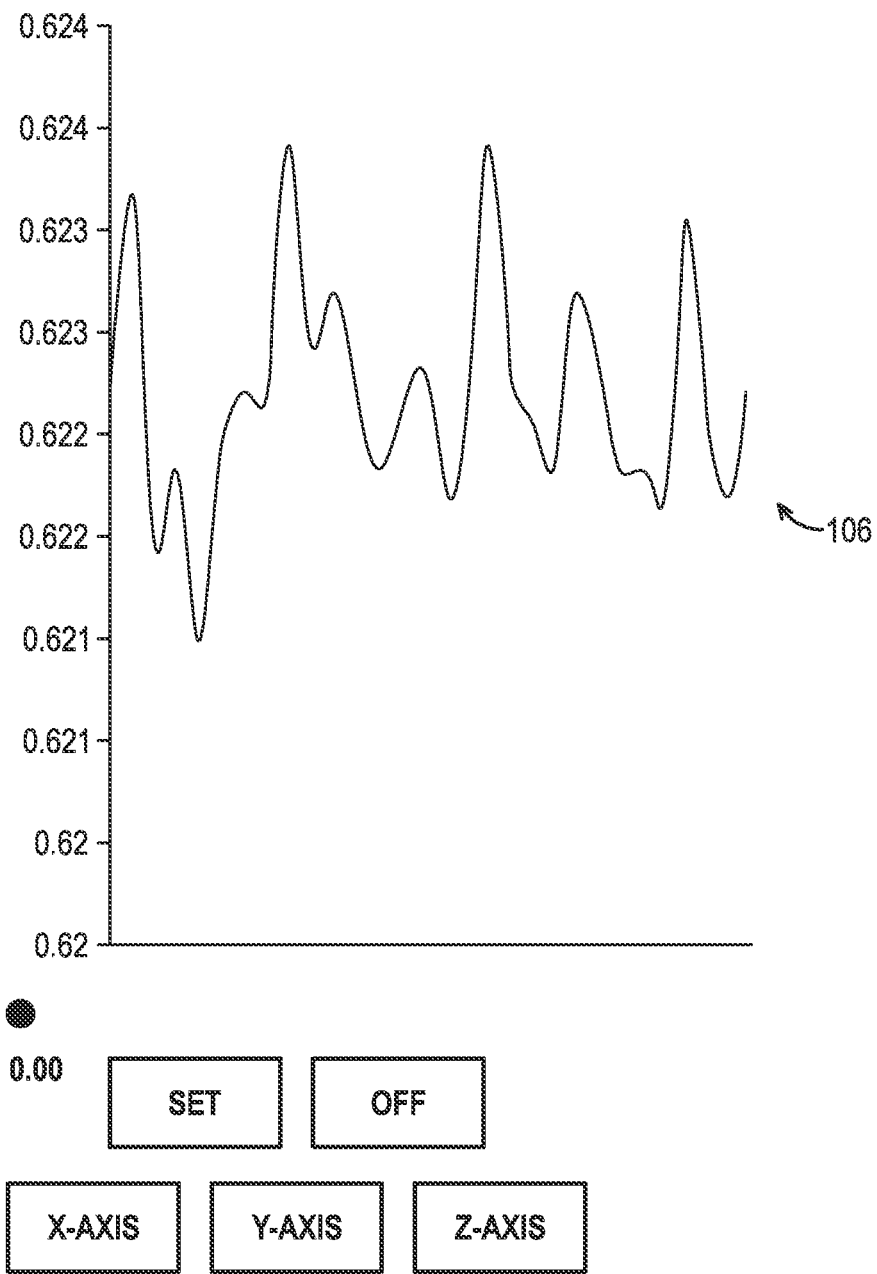
FIG. 5 is a graph depicting an example of vibration data in accordance with aspects of the present disclosure.
Figure 6:
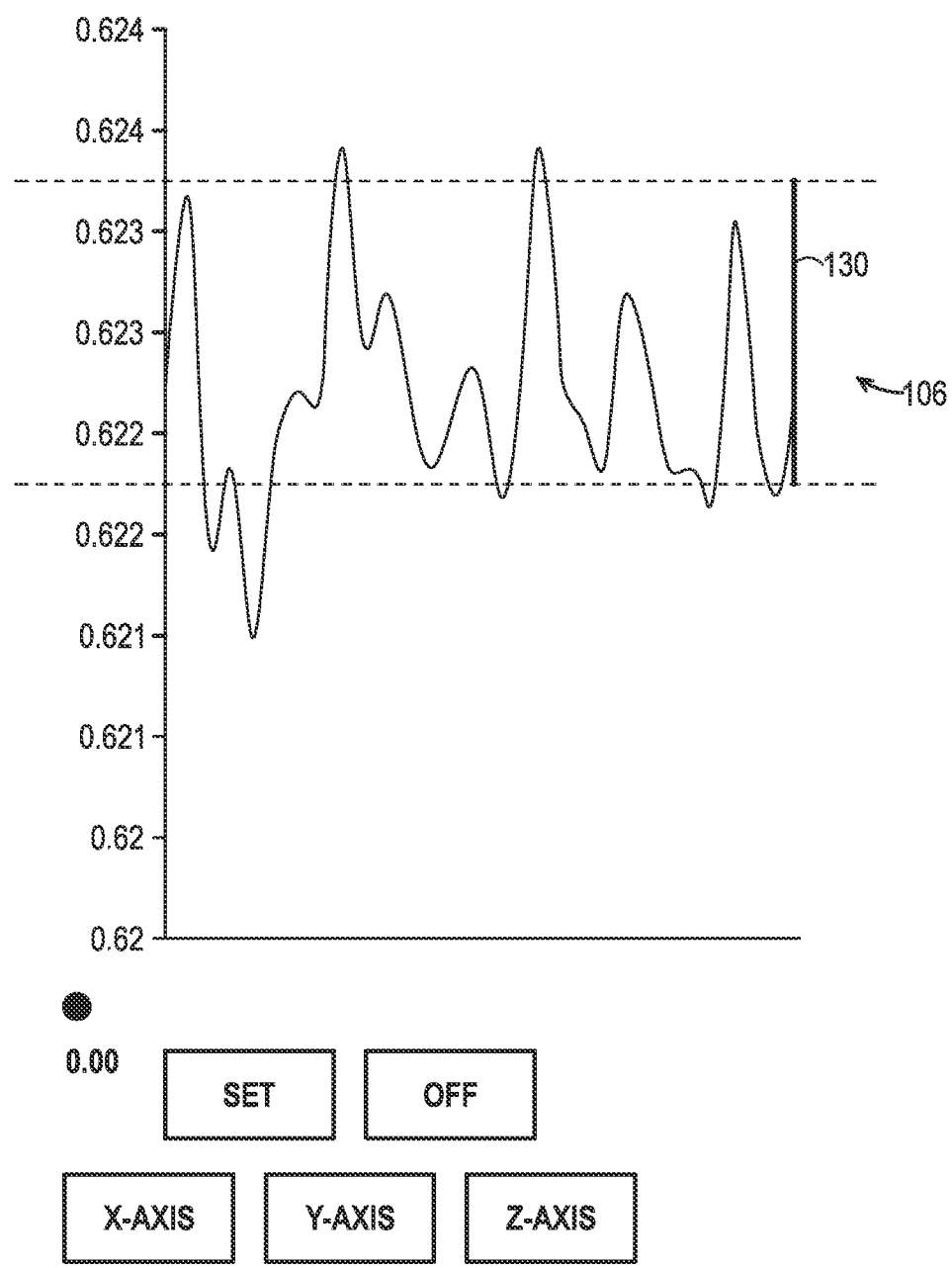
FIG. 6 is a graph depicting an amplitude threshold value in accordance with aspects of the present disclosure.

With respect to FIGS. 5 and 6, data processing system 112 is configured to analyze vibration data 106 to determine the fishing event. Analyzing vibration data 106 may include analyzing vibration data 106 to identify changes (e.g., spikes, oscillations, etc.) in an amplitude of the vibrations, changes in a frequency of the vibrations, changes in the phase/orientation of the vibrations, and/or other changes in vibration data 106 indicative of a fishing event.

As shown in FIG. 6, an amplitude threshold value 130 may be utilized to analyze vibration data 106. For example, data processing system 112 may compare an amplitude (e.g., an instantaneous amplitude, an amplitude envelope, etc.) of vibration data 106 to amplitude threshold value 130 to determine the occurrence of a fishing event.

Amplitude threshold value 130 may be automatically assigned, for example, by assigning an amplitude threshold value associated with a historical fishing event or based on a selection of a species of fish. In some examples, amplitude threshold value 130 is a learned value. For example, amplitude threshold value 130 may be automatically assigned, e.g., by a machine learning algorithm trained on historical fishing event data. In some examples, there may be multiple amplitude threshold values indicative of various different fishing events and/or to differentiate between different fish sizes, fish ages, and/or fish species. In some examples, amplitude threshold value 130 is manually assigned, for example, by a user or during manufacturing.

In some examples, data processing system 112 may analyze vibration data 106 by identifying pulses and/or duty cycles in the amplitude of vibration data 106. For example, data processing system 112 may be configured to determine a ratio of time in which the amplitude of vibration data 106 is greater than amplitude threshold value 130 compared to the time in which the amplitude of vibration data 106 is less than amplitude threshold value 130.

A determined pulse length and/or duty cycle may be used by the system to determine which specific species of fish is on the line. For example, different species of fish may have different response behaviors when hooked on a fishing line, resulting in species-specific pulses and/or duty cycles in the vibrations. In some examples, each species-specific amplitude pulse length may be a learned value, e.g., learned by a machine learning model trained on historical vibration data.

Data processing system 112 may analyze vibration data 106 by identifying changes in the frequency and/or component frequencies of the vibrations. For example, changes to the frequency and/or component frequencies of the vibration may be identified and categorized as one or more fishing events. Data processing system 112 may identify changes in the frequency and/or component frequencies of the vibrations by utilizing a Fourier transform (FT) to separate component frequencies of the vibrations and identifying changes in the component frequencies.

In some examples, the Fourier transform is implemented as a discrete Fourier transform (DFT) algorithm for analyzing the frequency domain of vibration data 106 at a discrete sample rate, e.g., at the sample rate of IMU 104. In some examples, the Fourier transform is implemented as a fast Fourier transform (FFT) algorithm. In some examples, the Fourier transform is implemented as a short-term Fourier transform (STFT) algorithm, such as a sliding DFT algorithm, or other suitable frequency analysis algorithm.

Data processing system 112 may analyze vibration data 106 by identifying a background noise frequency of the vibrations (e.g., via an FT algorithm), and filtering vibration data 106 to remove the background noise frequency. For example, a background noise frequency corresponding to a motion of a lure and/or flasher within the water may be removed and/or dampened. In some examples, the background noise frequency is automatically determined, e.g., based on a known frequency associated with a known lure and/or flasher. For example, a user may provide system 100 with information related to the lure and/or flasher, such as type, make, model, size, etc., and the background noise frequency may be determined accordingly.

Data processing system 112 may analyze vibration data 106 by identifying changes to the phase and/or orientation of the vibrations. Changes to the phase and/or the orientation of the vibrations may be identified by comparing the relative amplitudes along/about respective axes of IMU 104 and identifying changes in the relative amplitudes that correspond to known fishing events. For example, certain debris types being caught on a lure and/or flasher, changes in tide conditions, and/or other events may correspond to changes in the phase and/or the orientation of the vibrations.

In some examples, the fishing event is a fish striking a lure and/or being hooked on a line of the fishing rod. Accordingly, an instantaneous amplitude of the vibrations may surpass the amplitude threshold value and may be indicative of a fish striking the lure and/or being hooked on the line. In examples in which there are multiple amplitude threshold values, data processing system 112 may discern between different sizes of fish based on the amplitude threshold value surpassed. Accordingly, fishing event data 116 may include a categorization of whether the fish is below a threshold weight value and/or of a target species.

In some examples, the fishing event is debris being hooked on a line of the fishing rod. The type of debris (e.g., kelp, seaweed, jellyfish, artificial debris, etc.) may be automatically determined by data processing system 112 by analyzing signal characteristics of vibration data 106. For example, by analyzing changes to amplitude, frequency, and/or orientation of the vibration data and comparing such values to known signal characteristics associated with a specific debris type, a determination of the type of debris may be accomplished.

In general, when trolling, there is often a target trolling speed for a given tackle (e.g., a flasher and a lure, a solo lure, etc.). However, in some cases, it may be difficult for an angler to maintain the target trolling speed, especially as conditions change. As trolling speed is measured with respect to the body of water, and the relative velocity of the water may change with fluctuating tides and currents, an angler may need to regularly update their boat speed to maintain the target trolling speed.

System 100 may be configured to automatically determine the updated trolling speed by analyzing vibration data 106. For example, a change in tide speed and/or tide direction may impart corresponding changes in a background noise frequency, other component frequencies, amplitude, and/or other signal characteristics in vibration data 106. System 100 is configured to analyze vibration data 106 to determine a current trolling speed. In some examples, determining the trolling speed may be dependent on the lure and/or flasher type being used.

In some examples, data processing system 112 is configured to compare one or more component frequencies and/or amplitude(s) of the vibration data to known values corresponding to known trolling speeds. In the case in which the determined trolling speed is different than the target trolling speed, system 100 may indicate to the user the difference between the two speeds and/or an updated boat speed necessary to achieve the target trolling speed.

B. Illustrative Fishing Event Monitoring System for Commercial Trolling

Figure 7:
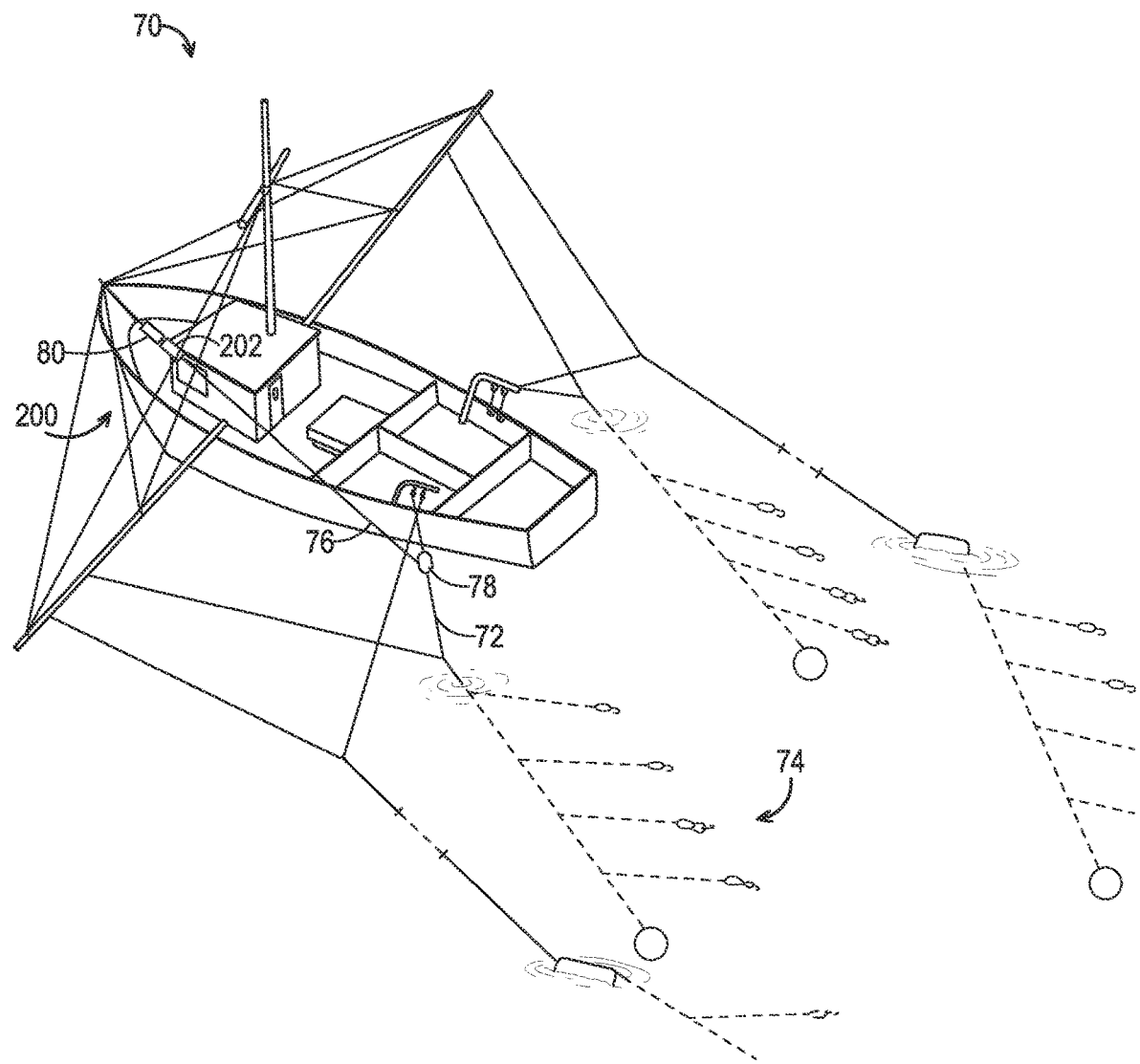
FIG. 7 depicts a commercial trolling assembly in accordance with aspects of the present disclosure.
Figure 8:
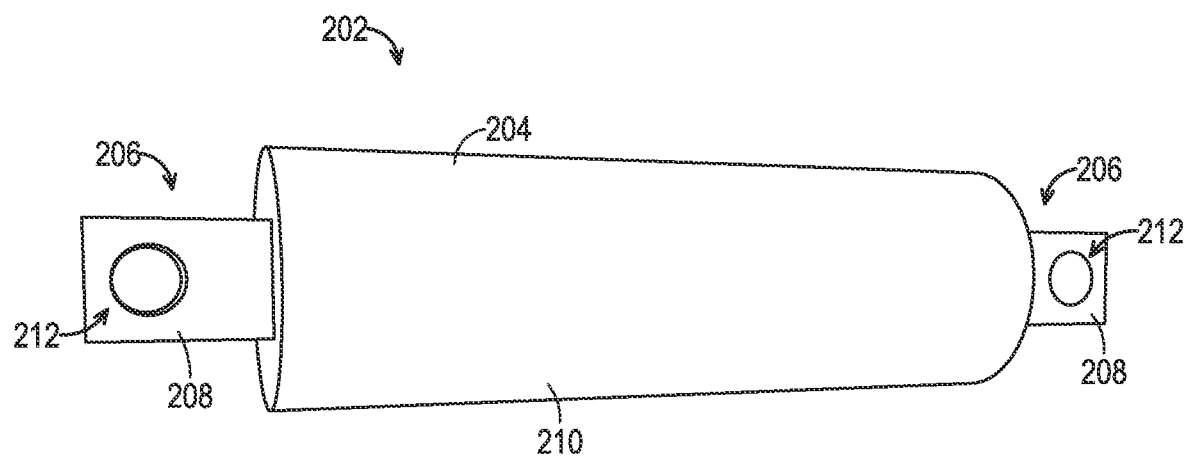
FIG. 8 is a perspective view of a fishing event monitoring system for use with the commercial trolling assembly of FIG. 7.

As shown in FIGS. 7 and 8, this section describes an illustrative fishing event monitoring system 200. System 200 is an example of the fishing event monitoring systems described above and is substantially similar to system 100, described above, except in the differences described below.

With respect to FIG. 7, system 200 is configured to be used with a commercial trolling assembly 70 to monitor vibrations transferred along a downrigger cable 72. In a typical commercial trolling assembly, rather than using a fishing rod, one or more lures or lure and flasher combinations 74 are attached directly to the downrigger cable(s) 72. In the example depicted in FIG. 7, commercial trolling assembly 70 may have multiple downrigger weights suspended from downrigger cables 72, with each downrigger cable having one or more lures or lure/flasher combinations 74.

A monitoring line 76 is coupled to downrigger cable 72 at a first end via a translatable fastener (e.g., a slidable ring) 78 and coupled to the bow of the boat at a second end via a biasing device 80. Biasing device 80 may comprise a spring, an elastic cord (e.g., a bungee cord), or another suitable biasing device. Accordingly, motion of the lures or lure/flasher combinations 74 is transferred through downrigger cable 72, thereby causing vibrations along monitoring line 76. A measurement device 202 of fishing event monitoring system 200 is configured to be coupled to monitoring line 76, such that vibrations imparted onto the monitoring line are measurable by the fishing event monitoring system. In some examples, measurement device 202 is disposed between biasing device 80 and monitoring line 76.

Turning to FIG. 8, an example measurement device 202 of fishing event monitoring system 200 is shown. Measurement device 202 includes a waterproof housing 204 having a coupling structure 206 configured to couple housing 204 to monitoring line 76. In the example depicted in FIG. 8, coupling structure 206 comprises a pair of brackets 208 extending from a body 210 of housing 204. Each bracket 208 includes an aperture 212 configured to receive a portion of monitoring line 76 and/or a portion of biasing device 80, such that measurement device 202 is retained thereon.

As with measurement device 102, measurement device 202 includes at least one inertial measurement unit (not shown) substantially similar to IMU 104 and configured to measure vibrations transmitted along downrigger cable 72 via monitoring line 76 to create vibration data. The vibration data is analyzed to determine a fishing event in a substantially similar manner to vibration data 106, described above, and method 300, described below.

C. Illustrative Method of Monitoring Fishing Events

This section describes steps of an illustrative method 300 for monitoring fishing events. Aspects of fishing event monitoring system 100 and/or fishing event monitoring system 200 may be utilized in the method steps described below. Where appropriate, reference may be made to components and systems that may be used in carrying out each step. These references are for illustration, and are not intended to limit the possible ways of carrying out any particular step of the method.

Figure 9:
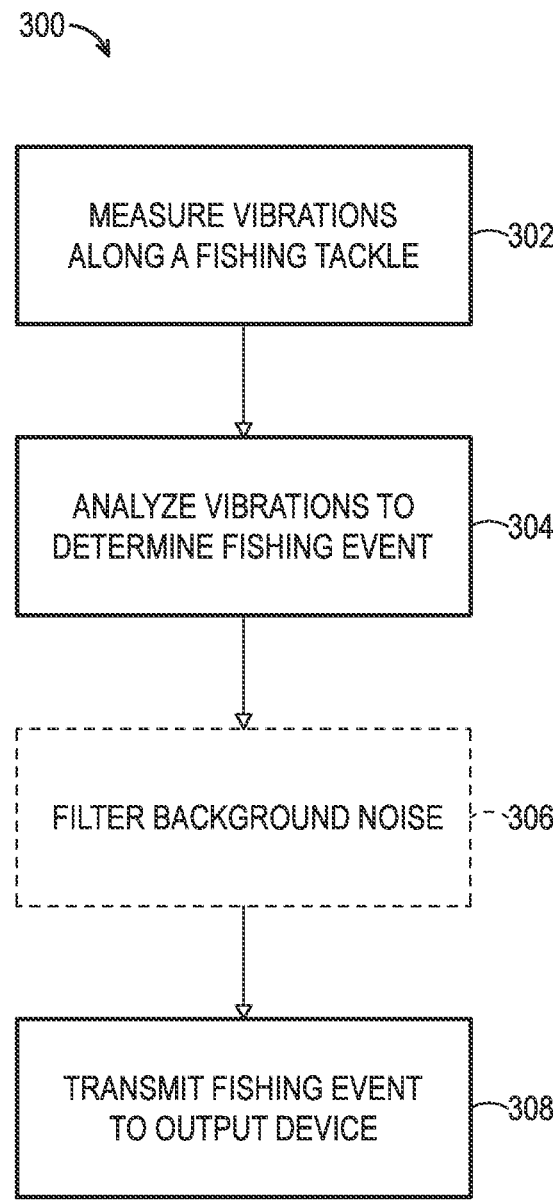
FIG. 9 is a flowchart depicting steps in illustrative methods of monitoring fishing events.

FIG. 9 is a flowchart illustrating steps performed in an illustrative method 300, and may not recite the complete process or all steps of the method. Although various steps of method 300 are described below and depicted in FIG. 9, the steps need not necessarily all be performed, and in some cases may be performed simultaneously or in a different order than the order shown.

Step 302 of method 300 includes measuring vibrations transmitted along a fishing tackle component, such as fishing rod 12 and/or downrigger cable 72. The vibrations are measured by at least one inertial measurement unit (IMU) coupled to the fishing tackle component. In some examples, the vibrations are imparted by tide conditions, changes to tide conditions, fish strikes, and other events and/or conditions which may cause vibrations along the fishing tackle component.

In some examples, step 302 includes measuring vibrations via one or more accelerometers configured to measure translational (e.g., linear) vibrations along one or more axes, such as vibrations along an X-axis, vibrations along a Y-axis, and/or vibrations along a Z-axis. Additionally, or alternatively, step 302 includes measuring vibrations via one or more gyroscopes configured to measure rotational vibrations about one or more axes, such as vibrations about an X-axis, vibrations about a Y-axis, and/or vibrations about a Z-axis.

In some examples, step 302 includes measuring vibrations only along and/or only about a single axis. For example, step 302 may include measuring vibrations along an axis perpendicular to the length of the fishing tackle component (e.g., side-to-side vibrations). Step 302 may occur continuously (e.g., via a continuous measurement system) or discretely (e.g., at a fixed sample rate).

Step 304 of method 300 includes analyzing the vibrations to determine a fishing event. The fishing event may be a fish striking the lure, a fish being caught on the line, debris being caught on the line, a change in tide conditions, and/or other event which may occur during fishing or trolling.

Step 304 may include analyzing the vibrations to identify changes (e.g., spikes, oscillations, etc.) in an amplitude of the vibrations, changes in a frequency of the vibrations, changes in the phase/orientation of the vibrations, and/or other changes in vibrations that may accompany a fishing event.

Step 304 may include comparing an amplitude of the vibrations (e.g., an instantaneous amplitude, an amplitude envelope, etc.) to an amplitude threshold value to determine the fishing event. The amplitude threshold value may be automatically assigned, for example, by assigning an amplitude threshold value associated with a historical fishing event or based on a selection of a species of fish, a learned value (e.g., learned by a machine learning algorithm based on historical fishing event data), or manually assigned, for example, by a user. In some examples, step 304 may include comparing an amplitude of the vibrations to multiple amplitude threshold values. For example, different threshold values may be used to differentiate between different fishing events and/or to differentiate between different fish sizes, fish ages, and/or fish species.

Step 304 may include identifying changes in the frequency and/or component frequencies of the vibrations and categorizing the changes as a fishing event. In some examples, step 304 includes identifying changes in the frequency and/or component frequencies of the vibrations by utilizing a Fourier transform (FT) to separate component frequencies of the vibrations and identifying changes thereof. The Fourier transform may be implemented as a discrete Fourier transform (DFT) algorithm for analyzing the frequency domain of the vibrations at a discrete sample rate, e.g., at a sample rate of step 302. Alternatively, the Fourier transform may be implemented as a fast Fourier transform (FFT) algorithm, a short-term Fourier transform (STFT) algorithm, such as a sliding DFT algorithm, or other suitable frequency analysis algorithm.

Step 304 may include identifying changes to the phase and/or orientation of the vibrations. In some examples, step 304 includes comparing the amplitudes along and/or about respective axes of measured in step 302 and identifying changes in the relative amplitudes that correspond to known fishing events. For example, certain debris types being caught on a lure and/or flasher, changes in tide conditions, and/or other events may correspond to changes in the phase and/or the orientation of the vibrations.

In some examples, the fishing event determined in step 304 is a fish striking a lure and/or being hooked on a line. In such examples, an instantaneous amplitude of the vibrations surpassing the amplitude threshold value may be indicative of a fish striking a lure and/or being hooked on the line. In examples in which there are multiple amplitude threshold values, step 304 may include discerning between different sizes of fish based on the amplitude threshold value surpassed.

In some examples, the fishing event determined in step 304 is the occurrence of debris being hooked on a line. Accordingly, step 304 may include determining the type of debris (e.g., kelp, seaweed, jellyfish, artificial debris, etc.) by analyzing characteristics of the vibrations. For example, by analyzing changes to amplitude, frequency, and/or orientation of the vibration data and comparing such values to known signal characteristics associated with a specific debris type, the debris type may be determined.

In some examples, the fishing event determined in step 304 is a change in tide speed and/or tide direction. Accordingly, step 304 may include identifying changes in a background noise frequency, other component frequencies, amplitude, and/or other characteristics in the vibrations corresponding to the change in tide speed and/or tide direction. In some examples, step 304 includes comparing one or more component frequencies and/or amplitude(s) of the vibrations to known values corresponding to known trolling speeds for specific lures or lure/flasher combinations.

Optional step 306 of method 300 includes identifying a background noise frequency of the vibrations and filtering the vibrations to remove the background noise frequency. For example, a background noise frequency corresponding to the motion of a lure and/or flasher within the water may be removed and/or dampened. In some examples, the background noise frequency is automatically determined, e.g., based on a known frequency associated with a known lure and/or flasher. For example, optional step 306 may utilize information related to the lure and/or flasher, such as type, make, model, size, etc., to identify the background noise frequency.

Step 308 of method 300 includes transmitting a signal indicative of the fishing event to an output device. The output device may include one or more visible indicators, such as light emitting diodes (LEDs), audible indicators, such as speakers, haptic indicators such as vibration motors, and/or other devices suitable for notifying the user of the fishing event.

In some examples, the output device is a mobile device (e.g., a smartphone) and step 308 includes transmitting the signal indicative of the fishing event to a user interface and/or notification system of the mobile device.

D. Illustrative Combinations and Additional Examples

This section describes additional aspects and features of fishing event monitoring systems and methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A fishing event monitoring system for use while trolling, comprising:
- a housing configured to be operatively coupled to a fishing rod and/or a fishing reel;
- an inertial measurement unit supported by the housing and configured to measure vibrations transmitted along the fishing rod and/or the fishing reel; and
- a data transmission system supported by the housing and configured to transmit a signal indicative of the vibrations to an output device.

A0.1. The fishing event monitoring system of paragraph A0, wherein the housing includes a clip configured to couple the housing to the fishing rod and/or the fishing reel.

A0.2. The fishing event monitoring system of paragraph A0 and/or paragraph A0.1, wherein the housing is waterproof.

A0.3. The fishing event monitoring system of paragraph A0, wherein the housing is integrated with the fishing rod.

A0.4. The fishing event monitoring system of any of paragraphs A0-A0.3, further comprising:
- a data processing system including:
  - one or more processors;
  - a memory; and
  - a plurality of instructions stored in the memory and executable by the one or more processors to analyze the vibrations to determine a fishing event and produce fishing event data.

A0.4.1. The fishing event monitoring system of paragraph A0.4, wherein the data processing system is supported by the housing.

A1. The fishing event monitoring system of paragraph A0.4 or A0.4.1, wherein the fishing event includes a fish being hooked on a line of the fishing rod and/or the fishing reel; and
wherein the fishing event data includes an indication that the fish is hooked on the line.

A1.1. The fishing event monitoring system of paragraph A1, wherein the data processing system is configured to determine if the fish is juvenile; and
wherein the fishing event data includes either: a) an indication that the fish is juvenile or b) an indication that the fish is not juvenile.

A1.2. The fishing event monitoring system of paragraph A1, wherein the data processing system is configured to determine that the fish is juvenile; and
wherein the fishing event data includes an indication that the fish is juvenile.

A1.3. The fishing event monitoring system of paragraph A1, wherein the data processing system is configured to determine that the fish is below a threshold weight; and
wherein the fishing event data includes an indication that the fish is below the threshold weight.

A2. The fishing event monitoring system of any of paragraphs A0.4-A1.3, wherein the fishing event includes a change in tide speed.

A3. The fishing event monitoring system of any of paragraphs A0.4-A2, wherein the fishing event includes a change in tide direction.

A4. The fishing event monitoring system of any of paragraphs A0.4-A3, wherein the data processing system is further configured to analyze the signal to determine a target trolling speed of a boat;
- wherein the fishing event includes a/the change in tide speed; and
- wherein the data processing system is configured to determine an updated trolling speed based on the trolling speed of the boat and the change in tide speed.

A5. The fishing event monitoring system of any of paragraphs A0.4-A3, wherein the data processing system is further configured to analyze the signal to determine a trolling speed of a boat;
- wherein the fishing event includes a/the change in tide direction; and
- wherein the data processing system is configured to determine an updated trolling speed based on the trolling speed of the boat and the change in tide direction.

A6. The fishing event monitoring system of any of paragraphs A0.4-A5, wherein the determining the fishing event includes identifying a frequency change in the signal.

A7. The fishing event monitoring system of any of paragraphs A0.4-A6, wherein the data processing system is configured to compare an amplitude of the vibrations to an amplitude threshold value to determine the fishing event.

A7.1. The fishing event monitoring system of paragraph A7, wherein the amplitude threshold value is based on a user input.

A7.2. The fishing event monitoring system of paragraph A7, wherein the amplitude threshold value is based on historical vibration data relating to historical fishing events.

A7.3. The fishing event monitoring system of paragraph A7, wherein the amplitude threshold value is automatically determined by an anomaly detection model.

A7.3.1. The fishing event monitoring system of paragraph A7.3, wherein the anomaly detection model comprises a machine learning model.

A8. The fishing event monitoring system of any of paragraphs A0.4-A7.3.1, wherein the fishing event includes debris being hooked on a/the line of the fishing rod and/or the fishing reel; and
wherein the fishing event data includes an indication that debris is hooked on the line.

A8.1. The fishing event monitoring system of paragraph A8, wherein the debris corresponds to a predetermined type of debris; and wherein the fishing event data includes the predetermined type of debris.

A8.1.1. The fishing event monitoring system of paragraph A8.1, wherein the predetermined type of debris comprises kelp, seaweed, jellyfish, and/or artificial debris.

A8.2. The fishing event monitoring system of any of paragraphs A8-A8.1.1, wherein the data processing system is configured to determine the predetermined type of debris by identifying a change in an amplitude and/or a frequency of the vibrations corresponding to the debris being hooked on the line.

A9. The fishing event monitoring system of any of paragraphs A0-A8.1, wherein the inertial measurement unit is configured to measure the vibrations at a predetermined sample rate.

A9.1. The fishing event monitoring system of paragraph A9, wherein the predetermined sample rate is based on a user input.

A10. The fishing event monitoring system of any of paragraphs A0-A9.1, wherein the output device is configured to notify a user of a/the fishing event.

A11. The fishing event monitoring system of paragraphs A10, wherein the output device is configured to notify the user of the fishing event via one or more indicators.

A11.1. The fishing event monitoring system of paragraph A11, wherein the one or more indicators comprise visible indicators.

A11.2. The fishing event monitoring system of paragraph A11, wherein the visible indicators comprise one or more light emitting diodes (LEDs).

A11.3. The fishing event monitoring system of paragraph A11, wherein the one or more indicators comprise audible indicators.

A11.4. The fishing event monitoring system of paragraph A11, wherein the one or more indicators comprise haptic indicators.

A12. The fishing event monitoring system of paragraph A10, wherein the output device is configured to notify the user of the fishing event via a user interface.

A12.1. The fishing event monitoring system of paragraph A12, wherein the user interface comprises a mobile application configured to be executed on a mobile device.

A13. The fishing event monitoring system of any of paragraphs A0.4-A12.1, wherein the plurality of instructions is further executable by the one or more processors to:
    analyze the vibrations to determine a background noise frequency of the vibrations; and
    filter the vibrations to remove the background noise frequency.

A13.1. The fishing event monitoring system of paragraph A13, wherein analyzing the vibrations to determine a background noise frequency includes using a Fourier transform (FT) to determine the background noise frequency.

B0. A trolling assembly comprising:
    a downrigger system including a boom, a downrigger line, and a downrigger weight;
    a fishing rod coupled to the downrigger system, the fishing rod having a fishing reel with a fishing line at least partially wound thereon; wherein the fishing line is coupled to the downrigger weight with a lure disposed at a distal end; and
    the fishing event monitoring system of any of paragraphs A0-A13.1.

C0. A method of monitoring fishing events, the method comprising:
    measuring, via an inertial measurement unit disposed on a fishing rod, vibrations transmitted along the fishing rod;
    analyzing the vibrations to determine a fishing event; and
    transmitting a signal indicative of the fishing event to one or more output devices.

C1. The fishing event monitoring system of paragraph C0, wherein the fishing event includes a fish being hooked on a line of the fishing rod; and
    wherein the signal includes an indication that the fish is hooked on the line.

C1.1. The method of monitoring fishing events of paragraph C1 further comprising:
    analyzing the vibrations to determine if the fish is below a target weight; and
    wherein the signal includes either: a) an indication that the fish is below the target weight or b) an indication that the fish is at or above the target weight.

C1.2. The method of monitoring fishing events of paragraph C1, further comprising:
    analyzing the vibrations to determine if the fish is below a target weight; and
    wherein the signal includes an indication that the fish is below the target weight.

C2. The method of monitoring fishing events of any of paragraphs C0-C1.2, wherein the fishing event includes a change in tide speed.

C3. The method of monitoring fishing events of any of paragraphs C0-C2, wherein the fishing event includes a change in tide direction.

C4. The method of monitoring fishing events of any of paragraphs C0-C3, wherein the fishing event includes a/the change in tide speed;
    the method further comprising:
        analyzing the vibrations to determine a trolling speed of a lure; and
        determining an updated trolling speed based on the trolling speed of the lure and the change in tide speed.

C5. The method of monitoring fishing events of any of paragraphs C0-C3, wherein the fishing event includes a/the change in tide direction;
    the method further comprising:
        analyzing the vibrations to determine a trolling speed of a lure; and
        determining an updated trolling speed based on the trolling speed of the lure and the change in tide direction.

C6. The method of monitoring fishing events of paragraphs C0-C5, wherein the analyzing the vibrations to determine the fishing event includes identifying a frequency change in the vibrations.

C7. The method of monitoring fishing events of any of paragraphs C0-C6, wherein the analyzing the vibrations to determine the fishing event includes comparing an amplitude of the vibrations to an amplitude threshold value.

C7.1. The method of monitoring fishing events of paragraph C7, wherein the amplitude threshold value is based on a user input.

C7.2. The method of monitoring fishing events of paragraph C7, wherein the amplitude threshold value is based on historical vibration data relating to historical fishing events.

C8. The method of monitoring fishing events of any of paragraphs C0-C7.2, wherein the fishing event includes debris being hooked on a/the line of the fishing rod; and
    wherein the signal includes an indication that debris is hooked on the line.

C8.1. The method of monitoring fishing events of paragraph C8, wherein the debris corresponds to a predetermined type of debris; and
    wherein the signal includes the predetermined type of debris.

C8.1.1. The method of monitoring fishing events of paragraph C8.1, wherein the predetermined type of debris comprises one or more of: kelp, seaweed, jellyfish, and/or artificial debris.

C8.2. The method of monitoring fishing events of any of paragraphs C8-C8.1.1, wherein analyzing the vibrations to determine the predetermined type of debris includes identifying a change in an amplitude and/or a frequency of the vibrations corresponding to the debris being hooked on the line.

C9. The method of monitoring fishing events of any of paragraphs C0-C8.1, wherein the measuring, via the inertial measurement unit disposed on the fishing rod, vibrations transmitted along the fishing rod occurs at a predetermined sample rate.

C9.1. The method of monitoring fishing events of paragraph C9, wherein the predetermined sample rate is based on a user input.

C10. The method of monitoring fishing events of any of paragraphs C0-C9.1, further comprising:
notifying a user of the fishing event via the one or more output devices.

C10.1. The method of monitoring fishing events of paragraph C10, wherein the one or more output devices include one or more visible indicators.

C10.2. The method of monitoring fishing events of paragraph C10.1, wherein the one or more visible indicators comprise one or more light emitting diodes (LEDs).

C10.3. The method of monitoring fishing events of paragraph C10, wherein the one or more output devices include one or more audible indicators.

C10.4. The method of monitoring fishing events of paragraph C10, wherein the one or more output devices include one or more haptic indicators.

C10.5. The method of monitoring fishing events of paragraph C10.4, wherein the one or more haptic indicators include one or more vibration motors.

C11. The method of monitoring fishing events of paragraph C10, wherein the one or more output devices include a user interface.

C11.1. The method of monitoring fishing events of paragraph C11, wherein the user interface comprises a mobile application configured to be executed on a mobile device.

C12. The method of monitoring fishing events of any of paragraphs C0-C11.1 further comprising:
analyzing the vibrations to determine a background noise frequency of the vibrations; and
filtering the vibrations to remove the background noise frequency.

C12.1. The method of monitoring fishing events of paragraph C12, wherein the analyzing the vibrations to determine a background noise frequency includes using a Fourier transform (FT) to determine the background noise frequency.

D0. A fishing event monitoring system comprising:
a housing configured to be operatively coupled to a fishing tackle component;
an inertial measurement unit supported by the housing; and
a computer readable storage medium comprising computer executable instructions that, when executed, direct a computing device to:
measure, via the inertial measurement unit, vibrations transmitted along the fishing tackle component;
analyze the vibrations to determine a fishing event; and
transmit a signal indicative of the fishing event to one or more output devices.

D1. The fishing event monitoring system of paragraph D0, wherein the fishing tackle component is a fishing rod.

D2. The fishing event monitoring system of paragraph D1, wherein the fishing event includes a fish being hooked on a line of the fishing rod; and
wherein the signal includes an indication that the fish is hooked on the line.

D3. The fishing event monitoring system of paragraph D2, wherein the computer executable instructions are configured to, when executed, direct the computing device to:
analyze the vibrations to determine if the fish is below a target weight; and
wherein the signal includes either: a) an indication that the fish is below the target weight or b) an indication that the fish is at or above the target weight.

D4. The fishing event monitoring system of paragraph D2, wherein the computer executable instructions are configured to, when executed, direct the computing device to analyze the vibrations to determine if the fish is below a threshold weight; and
wherein the signal includes an indication that the fish is below the threshold weight.

D5. The fishing event monitoring system of any of paragraphs D0-D4, wherein the fishing event includes a change in tide speed; and
wherein the computer executable instructions are configured to, when executed, direct the computing device to:
analyze the vibrations to determine a trolling speed of a lure; and
determine an updated trolling speed based on the trolling speed of the lure and the change in tide speed.

D6. The fishing event monitoring system of any of paragraphs D0-D5, wherein the computer executable instructions are configured to direct the computing device to, when executed, analyze the vibrations to determine the fishing event by identifying a frequency change in the vibrations.

D7. The fishing event monitoring system of any of paragraphs D0-D6, wherein the computer executable instructions are configured to direct the computing device to, when executed, analyze the vibrations to determine the fishing event by comparing an amplitude of the vibrations to an amplitude threshold value.

D8. The fishing event monitoring system of paragraph D7, wherein the amplitude threshold value is based on historical vibration data relating to historical fishing events.

D9. The fishing event monitoring system of any of paragraphs D0-D8, wherein the fishing tackle component is a fishing rod or a downrigger cable;
wherein the fishing event includes debris being hooked on a line of the fishing rod or the downrigger cable; and
wherein the signal includes an indication that debris is hooked on the line.

D10. The fishing event monitoring system of paragraph D9, wherein the debris corresponds to a predetermined type of debris; and
wherein the signal includes the predetermined type of debris.

D11. The fishing event monitoring system of paragraph D10, wherein the predetermined type of debris comprises one or more of: kelp, seaweed, jellyfish, and/or artificial debris.

D12. The fishing event monitoring system of paragraph D11, wherein the computer executable instructions are configured to, when executed, direct the computing device to analyze the vibrations to determine the fishing event by identifying a change in an amplitude and/or a frequency of the vibrations corresponding to the debris being hooked on the line or the downrigger cable.

D13. The fishing event monitoring system of any of paragraphs D0-D12, wherein the computer executable instructions are configured to, when executed, direct the computing device to notify a user of the fishing event via the one or more output devices.

D14. The fishing event monitoring system of paragraph D13, wherein the one or more output devices include one or more visible indicators.

D15. The fishing event monitoring system of paragraph D14, wherein the one or more visible indicators comprise one or more light emitting diodes (LEDs).

D16. The fishing event monitoring system of paragraph D15, wherein the one or more output devices include one or more audible indicators.

D17. The fishing event monitoring system of paragraph D15, wherein the one or more output devices comprise a mobile device having a user interface.

D18. The fishing event monitoring system of any of paragraphs D0-D17, wherein the computer executable instructions are configured to, when executed, direct the computing device to:
analyze the vibrations to determine a background noise frequency of the vibrations; and
filter the vibrations to remove the background noise frequency.

E0. A method of monitoring fishing events comprising:
measuring, via an inertial measurement unit disposed on a fishing tackle component, vibrations transmitted along the fishing tackle component;
analyzing the vibrations to determine a fishing event; and
transmitting a signal indicative of the fishing event to an output device.

Advantages, Features, and Benefits

The different embodiments and examples of fishing event monitoring systems and methods described herein provide several advantages over known solutions for monitoring for fishing events. For example, illustrative embodiments and examples described herein allow the detection of fish strikes.

Additionally, and among other benefits, illustrative embodiments and examples described herein allow the detection of changes to tide conditions.

Additionally, and among other benefits, illustrative embodiments and examples described herein allow the detection of debris being caught on the fishing line.

Additionally, and among other benefits, illustrative embodiments and examples described herein allow the automatic determination of the species, relative size and/or age of a fish on the line.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A fishing event monitoring system comprising:
a housing configured to be operatively coupled to a fishing tackle component;
an inertial measurement unit supported by the housing; and
a computer readable storage medium comprising computer executable instructions that, when executed, direct a computing device to:
measure, via the inertial measurement unit, vibrations transmitted along the fishing tackle component;
analyze the vibrations to determine a background noise frequency of the vibrations;
filter the vibrations to remove the background noise frequency;
analyze the vibrations to determine a fishing event; and
transmit a signal indicative of the fishing event to one or more output devices.

2. The fishing event monitoring system of claim 1, wherein the fishing tackle component is a fishing rod.

3. The fishing event monitoring system of claim 1, wherein the fishing tackle component is a downrigger cable.

4. The fishing event monitoring system of claim 2, wherein the fishing event includes a fish being hooked on a line of the fishing rod; and
wherein the signal includes an indication that the fish is hooked on the line.

5. The fishing event monitoring system of claim 4, wherein the computer executable instructions are configured to, when executed, direct the computing device to analyze the vibrations to determine if the fish is below a threshold weight; and
wherein the signal includes an indication that the fish is below the threshold weight.

6. The fishing event monitoring system of claim 1, wherein the fishing event includes a change in tide speed; and
wherein the computer executable instructions are configured to, when executed, direct the computing device to:
analyze the vibrations to determine a trolling speed of a lure; and
determine an updated trolling speed based on the trolling speed of the lure and the change in tide speed.

7. The fishing event monitoring system of claim 1, wherein the computer executable instructions are configured to direct the computing device to, when executed, analyze the vibrations to determine the fishing event by identifying a frequency change in the vibrations.

8. The fishing event monitoring system of claim 1, wherein the computer executable instructions are configured to direct the computing device to, when executed, analyze the vibrations to determine the fishing event by comparing an amplitude of the vibrations to an amplitude threshold value.

9. The fishing event monitoring system of claim 8, wherein the amplitude threshold value is based on historical vibration data relating to historical fishing events.

10. The fishing event monitoring system of claim 1, wherein the fishing event includes debris being hooked on a line of the fishing tackle component; and
wherein the signal includes an indication that debris is hooked on the line.

11. The fishing event monitoring system of claim 10, wherein the debris corresponds to a predetermined type of debris; and
wherein the signal includes the predetermined type of debris.

12. The fishing event monitoring system of claim 11, wherein the predetermined type of debris comprises one or more of: kelp, seaweed, jellyfish, and/or artificial debris.

13. The fishing event monitoring system of claim 12, wherein the computer executable instructions are configured to, when executed, direct the computing device to analyze the vibrations to determine the fishing event by identifying a change in an amplitude and/or a frequency of the vibrations corresponding to the debris being hooked on the line.

14. The fishing event monitoring system of claim 1, wherein the computer executable instructions are configured to, when executed, direct the computing device to notify a user of the fishing event via the one or more output devices.

15. The fishing event monitoring system of claim 14, wherein the one or more output devices include one or more visible indicators.

16. The fishing event monitoring system of claim 15, wherein the one or more visible indicators comprise one or more light emitting diodes (LEDs).

17. The fishing event monitoring system of claim 14, wherein the one or more output devices include one or more audible indicators.

18. The fishing event monitoring system of claim 14, wherein the one or more output devices comprise a mobile device having a user interface.

19. A method of monitoring fishing events comprising:
measuring, via an inertial measurement unit disposed on a fishing tackle component, vibrations transmitted along the fishing tackle component;
analyzing the vibrations to determine a background noise frequency of the vibrations;
filtering the vibrations to remove the background noise frequency;
analyzing the vibrations to determine a fishing event; and
transmitting a signal indicative of the fishing event to an output device.

20. The method of claim 19, wherein the fishing event includes a fish being hooked on a line of the fishing tackle component; and
wherein the signal includes an indication that the fish is hooked on the line.

21. A fishing event monitoring system comprising:
a housing configured to be operatively coupled to a fishing tackle component;
an inertial measurement unit supported by the housing; and
a computer readable storage medium comprising computer executable instructions that, when executed, direct a computing device to:
measure, via the inertial measurement unit, vibrations transmitted along the fishing tackle component;
analyze the vibrations to determine a fishing event, wherein the fishing event includes a fish being hooked on a line of the fishing tackle component;
analyze the vibrations to determine if the fish is below a threshold weight; and
transmit a signal indicative of the fishing event to one or more output devices;
wherein the signal includes an indication that the fish is hooked on the line; and
wherein the signal includes an indication that the fish is below the threshold weight.

22. A fishing event monitoring system comprising:
a housing configured to be operatively coupled to a fishing tackle component;
an inertial measurement unit supported by the housing; and
a computer readable storage medium comprising computer executable instructions that, when executed, direct a computing device to:
measure, via the inertial measurement unit, vibrations transmitted along the fishing tackle component;
analyze the vibrations to determine a fishing event, wherein the fishing event includes a change in tide speed; and
analyze the vibrations to determine a trolling speed of a lure;
determine an updated trolling speed based on the trolling speed of the lure and the change in tide speed;
transmit a signal indicative of the fishing event to one or more output devices.

23. The fishing event monitoring system of claim 22, wherein the signal includes the updated trolling speed.

24. The fishing event monitoring system of claim 22, wherein the computer executable instructions are configured to direct the computing device to, when executed, analyze the vibrations to determine the fishing event by identifying a frequency change in the vibrations.

25. The fishing event monitoring system of claim 22, wherein the computer executable instructions are configured to direct the computing device to, when executed, analyze the vibrations to determine the fishing event by comparing an amplitude of the vibrations to an amplitude threshold value.

26. A fishing event monitoring system comprising:
a housing configured to be operatively coupled to a fishing tackle component;
an inertial measurement unit supported by the housing; and
a computer readable storage medium comprising computer executable instructions that, when executed, direct a computing device to:
measure, via the inertial measurement unit, vibrations transmitted along the fishing tackle component;
analyze the vibrations to determine the fishing event by comparing an amplitude of the vibrations to an amplitude threshold value; and
transmit a signal indicative of the fishing event to one or more output devices;
wherein the amplitude threshold value is based on historical vibration data relating to historical fishing events.

27. The fishing event monitoring system of claim 26, wherein the fishing event includes a fish being hooked on a line of the fishing tackle component; and
wherein the signal includes an indication that the fish is hooked on the line.

28. A fishing event monitoring system comprising:
a housing configured to be operatively coupled to a fishing tackle component;

an inertial measurement unit supported by the housing; and a computer readable storage medium comprising computer executable instructions that, when executed, direct a computing device to:

measure, via the inertial measurement unit, vibrations transmitted along the fishing tackle component;

analyze the vibrations to determine a fishing event, wherein the fishing event includes debris being hooked on a line of the fishing tackle component; and transmit a signal indicative of the fishing event to one or more output devices;

wherein the debris corresponds to a predetermined type of debris; and wherein the signal includes the predetermined type of debris.

29. The fishing event monitoring system of claim 28, wherein the predetermined type of debris comprises one or more of: kelp, seaweed, jellyfish, and/or artificial debris.

30. The fishing event monitoring system of claim 29, wherein the computer executable instructions are configured to, when executed, direct the computing device to analyze the vibrations to determine the fishing event by identifying a change in an amplitude and/or a frequency of the vibrations corresponding to the debris being hooked on the line.

* * * * *